United States Patent
Hsu et al.

(10) Patent No.: US 8,905,317 B1
(45) Date of Patent: Dec. 9, 2014

(54) CO-LOCATED PASSIVE UHF RFID TAG AND NFC ANTENNA IN COMPACT ELECTRONIC DEVICES

(75) Inventors: Morris Hsu, Santa Clara, CA (US); Anuj Dron, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 100 days.

(21) Appl. No.: 13/491,420

(22) Filed: Jun. 7, 2012

(51) Int. Cl.
*G06K 19/06* (2006.01)

(52) U.S. Cl.
USPC .......................................... 235/492; 235/487

(58) Field of Classification Search
USPC ................................. 235/487, 492
See application file for complete search history.

(56) References Cited

U.S. PATENT DOCUMENTS

| | | | |
|---|---|---|---|
| 6,057,803 A * | 5/2000 | Kane et al. .................... 343/713 |
| 7,261,240 B2 * | 8/2007 | Akiho et al. .................. 235/492 |
| 7,339,531 B2 * | 3/2008 | Desclos et al. ................ 343/702 |
| 7,374,105 B2 * | 5/2008 | Zhu et al. ...................... 235/492 |
| 7,693,313 B2 * | 4/2010 | Ehlers et al. .................. 382/124 |
| 8,232,880 B2 * | 7/2012 | Yamazaki et al. .......... 340/572.7 |
| 8,579,203 B1 * | 11/2013 | Lambeth et al. ............. 235/492 |
| 2005/0207624 A1 * | 9/2005 | Ehlers et al. .................. 382/124 |
| 2007/0095926 A1 * | 5/2007 | Zhu et al. ...................... 235/492 |
| 2009/0121676 A1 * | 5/2009 | Wu et al. ....................... 320/108 |
| 2009/0146796 A1 * | 6/2009 | Goto et al. .................. 340/10.51 |
| 2010/0109968 A1 * | 5/2010 | Suzuki et al. ................. 343/876 |
| 2011/0234463 A1 * | 9/2011 | Lankes et al. ................. 343/728 |
| 2011/0279242 A1 * | 11/2011 | Krawczewicz ............. 340/10.6 |
| 2012/0098642 A1 * | 4/2012 | Krawczewicz et al. ...... 340/10.1 |
| 2012/0109735 A1 * | 5/2012 | Krawczewicz et al. .... 705/14.27 |
| 2012/0111950 A1 * | 5/2012 | Worrall et al. ................ 235/488 |
| 2014/0168019 A1 * | 6/2014 | Hirobe et al. ................. 343/720 |

* cited by examiner

*Primary Examiner* — Paultep Savusdiphol
(74) *Attorney, Agent, or Firm* — Lowenstein Sandler LLP (57) ABSTRACT

An electronic device including a Near Field Communication (NFC) antenna and a Radio-Frequency Identification (RFID) tag. The RFID tag may be disposed within an inner region of the antenna that does not contain structural features of the antenna.

25 Claims, 6 Drawing Sheets

CO-LOCATED PASSIVE UHF RFID TAG AND NFC ANTENNA IN COMPACT ELECTRONIC DEVICES

BACKGROUND OF THE INVENTION

A large and growing population of users enjoys entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like.

These electronic devices often use wireless communication systems to download or upload digital media items or otherwise transmit information from or receive information into the device. It may be desirable for an electronic device to employ multiple wireless communication systems that support different communication protocols. However, increasing the number of communication systems may increase the size of the electronic device.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION OF THE PRESENT INVENTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of embodiments of the present invention.

Embodiments of an electronic device are described which include multiple wireless communication systems. The electronic device includes a Near Field Communication (NFC) wireless communication system and a Radio-Frequency Identification (RFID) wireless communication system having an RFID tag. The NFC wireless communication system includes an antenna. In one embodiment, the antenna has a structure with in an inner region having no structural features. In one embodiment, the RFID tag is disposed within this inner region of the antenna. The positioning of the RFID tag within the inner region of the antenna allows for a compact design of the electronic device. Moreover, the antenna and the RFID tag may not significantly affect the performance of each other when they are operated at different frequencies or at different times.

Figure 1:
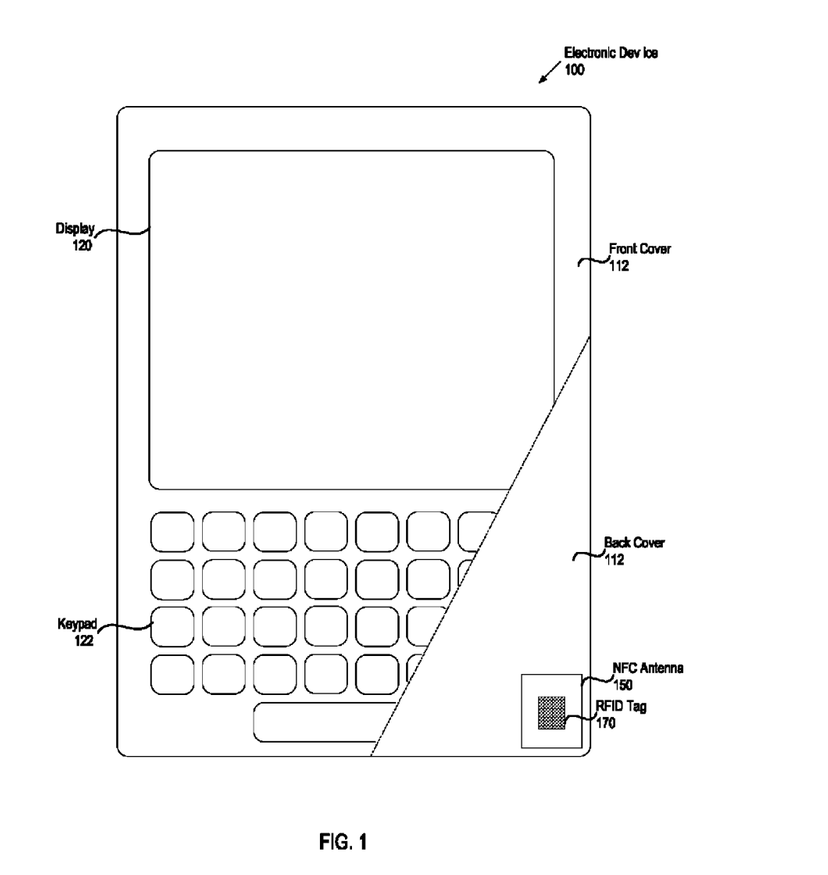
FIG. 1 illustrates an embodiment of an electronic device including a Near Field Communication (NFC) antenna and a Radio-Frequency Identification (RFID) tag.

FIG. 1 illustrates an embodiment of an electronic device 100 including an NFC antenna 150 and an RFID tag 170. The electronic device 100 may include an electronic book reader, a cellular telephone, a personal digital assistant (PDAs), a portable media player, a tablet computer, a netbook, or any portable, compact electronic device. The electronic device 100 is surrounded by a front cover 112 and a back cover 114. The front cover 112 and back cover 114 can provide structural support and can protect internal components from damage. In one embodiment, the front cover 112 and back cover 114 are composed of plastic or another non-metallic or non-conductive material.

The electronic device 100 includes a display 120 and a keypad 122. The electronic device 100 may further include other components for transmitting information to and receiving information from a user, including, but not limited to, a speaker, a microphone, a vibrator, and a touchpad. As described below with respect to FIG. 6, the electronic device 100 can include other components not illustrated in FIG. 1 for ease of understanding certain aspects of specific embodiments.

The electronic device 100 includes multiple wireless communication systems. In particular, the electronic device 100 includes an NFC wireless communication system that includes, at least, an NFC antenna 150. The electronic device 100 further includes a RFID wireless communication system that includes, at least, an RFID tag 170. In the embodiment illustrated in FIG. 1, the NFC antenna 150 and RFID 170 are co-located at a portion of the back cover 114. In other embodiments, such as the embodiment described below with respect to FIG. 2, the NFC antenna 150 and RFID 170 are not co-located.

Figure 2:
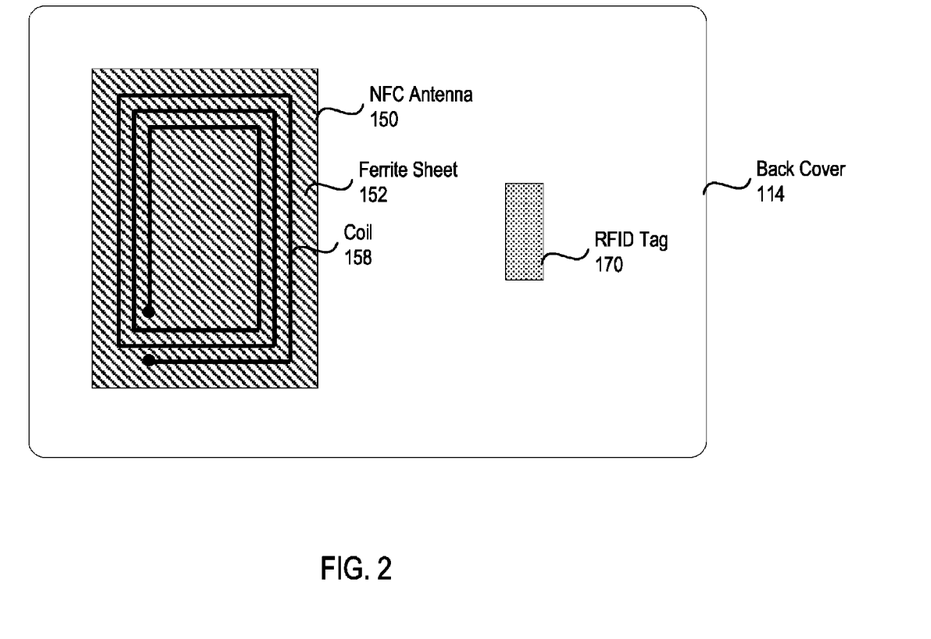
FIG. 2 illustrates an embodiment of a back cover of an electronic device including an NFC antenna and an RFID tag at different locations.

FIG. 2 illustrates an embodiment of a back cover 114 of an electronic device including an NFC antenna 150 and an RFID tag 170 at different locations. The NFC antenna 150 includes an electrically conductive coil 158 disposed on a ferrite sheet 152. In one embodiment, the coil 158 is metal. For example, the coil 158 may be fabricated as a metallic trace. In other embodiments, the coil 158 is composed of a non-metallic conductive material. In certain embodiments, the ferrite sheet 152 may be replaced with a sheet of another non-conductive material that shields the coil 158 from contacting metal components of the electronic device and, thereby, creating a short circuit.

The NFC antenna 150 is coupled to the back cover 114. The RFID tag 170 is also coupled to the back cover 114. The NFC antenna 150 and RFID tag 170 may be coupled to the back cover 114 by a non-conductive adhesive. As mentioned above, in one embodiment, the back cover 114 may composed of plastic. In other embodiments, the back cover 114 may be composed partially of metal, but with the NFC antenna 150 and RFID tag 170 coupled to a non-metallic portion of the back cover 114.

In one embodiment, the NFC antenna 150 operates at approximately 13.56 megahertz (MHz). In one embodiment, the RFID tag 170 is an ultra-high frequency (UHF) RFID tag that operates between 860 MHz to 960 MHz. In other embodiments, the RFID tag 170 operates at other frequencies. For example, the RFID tag 170 may operate in a range between 120 kilohertz (kHz) to 150 kHz, at approximately 13.56 MHz, at approximately 433 MHz, between 2450 MHz and 5800 MHz, or between 3.1 gigahertz (GHz) and 10 GHz. In one embodiment, the operating frequencies of the NFC antenna 150 and RFID tag 170 are sufficiently different to avoid interference. For example, in one embodiment, the operating frequency of the NFC antenna 150 is at least an order of magnitude lower than the operating frequency of the RFID tag 170. In another embodiment, the operating frequency of the NFC antenna 150 is at least an order of magnitude higher than the operating frequency of the RFID tag 170.

The NFC antenna 150, as apart of the NFC communication system, may communicate according to one or more NFC standards. In one embodiment, the NFC communication system uses magnetic induction between the NFC antenna 150 and another antenna of another device, each located within each other's near field, effectively forming an air-core transformer. In one embodiment, the NFC communication system has a working distance up to about 4 centimeters. In another embodiment, the NFC communication system has a working distance up to about 20 centimeters. In one embodiment, the NFC communication system transmits data at 106, 212, or 424 kbits/s. Alternatively, in other embodiments, the NFC communication system may have different working distances and communication at different data rates than those mentioned above.

The RFID tag 170 may include multiple components. The RFID tag 170 may include an integrated circuit capable of storing and processing information, modulating and demodulating a radio-frequency signal, collecting direct current (DC) power from a reader signal, or performing other functions. The RFID tag 170 may also include an antenna for receiving and transmitting a data signal. The RFID tag 170 may be a passive tag that does not include a battery, but draws power from signals transmitted to the RFID tag 170. Alternatively, in another embodiment, the RFID tag 170 may be an active RFID tag that includes a battery for powering various components, such as an integrated circuit. The RFID tag 170 may include a housing which surrounds the other components of the RFID tag 170. In other embodiments, the RFID tag may include fewer or additional components to those described above.

Although the RFID tag 170 has been described above as attached to the back cover, it is to be appreciated that the RFID tag 170 may be coupled to the electronic device at other locations 100. For example, the RFID tag 170 may be coupled to a component of the electronic device that faces the back cover 114 or otherwise attached to the electronic device proximal to the back cover 114. In other embodiments, the RFID tag 170 may be coupled facing away from or far from the back cover 114.

Figure 3:
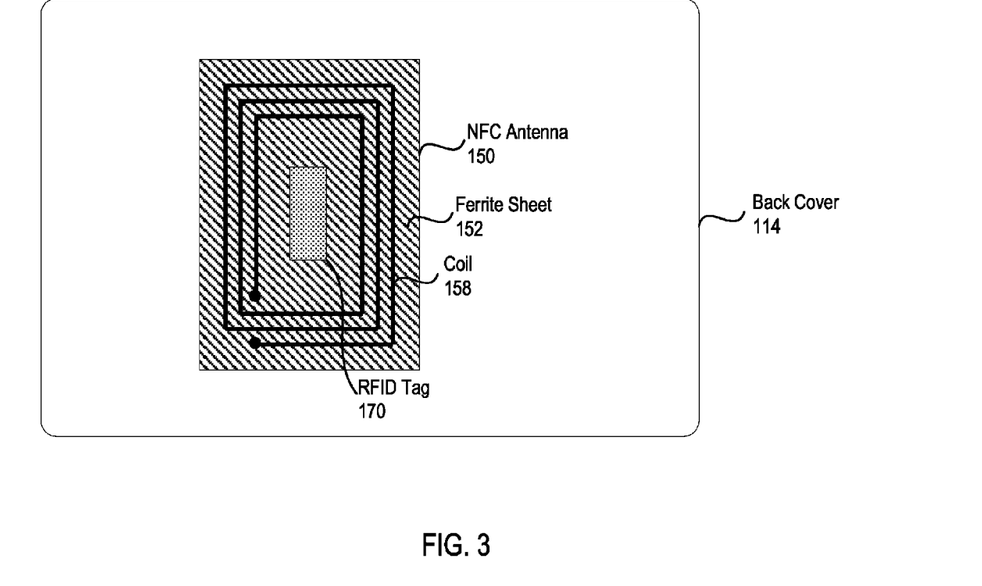
FIG. 3 illustrates an embodiment of a back cover of an electronic device including an NFC antenna and an RFID tag disposed on the NFC antenna.

FIG. 3 illustrates an embodiment of a back cover 114 of an electronic device including an NFC antenna 150 and an RFID tag 170 disposed on the NFC antenna 150. In the embodiment illustrated in FIG. 3, the NFC antenna 150 and RFID tag 170 are co-located. The NFC antenna 150 is coupled to the back cover 114 and the RFID tag 170 is coupled to the NFC antenna 150. In particular, the RFID tag 170 is coupled to the ferrite sheet 152 such that the RFID tag 170 is surrounded by the coil 158. Thus, the combination of the NFC antenna 150 and RFID tag 170 as positioned in FIG. 3 take up less space of the back cover 114 than the NFC antenna 150 and RFID tag 170 as positioned in FIG. 2.

Figure 4:
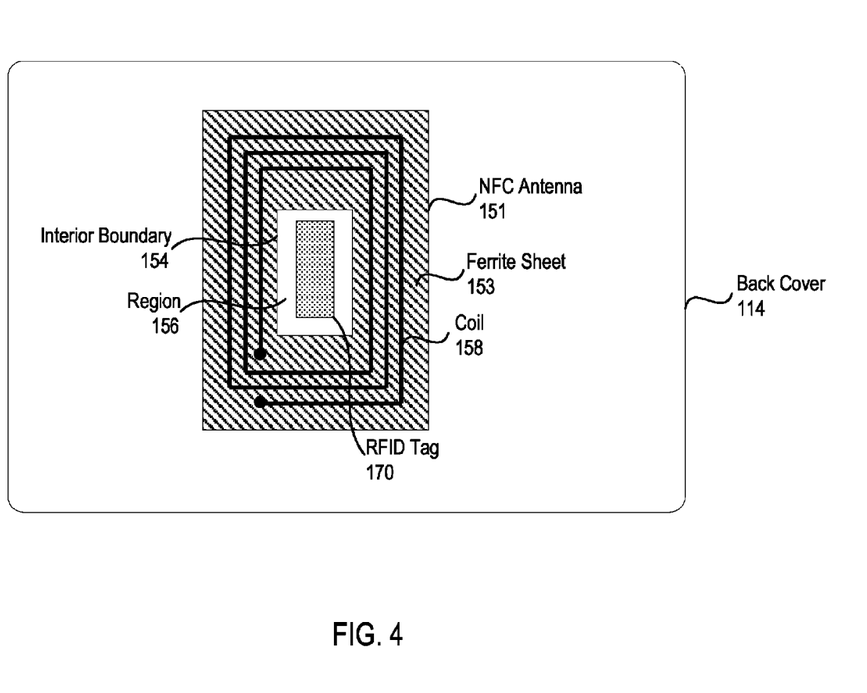
FIG. 4 illustrates an embodiment of a back cover of an electronic device including an NFC antenna and an RFID tag disposed within a region defined by the NFC antenna.

FIG. 4 illustrates an embodiment of a back cover 114 of an electronic device including an NFC antenna 151 and an RFID tag 170 disposed within a region 156 defined by the NFC antenna 151. In the embodiment illustrated in FIG. 4, like the embodiment of FIG. 3, the NFC antenna 151 and RFID tag 170 are co-located. The NFC antenna 151 is substantially similar to the NFC antenna 150 of FIG. 3 except that the NFC antenna 151 of FIG. 4 includes a ferrite sheet 153 having an inner surface 154 that defines a region 156 surrounded by the coil 158. The RFID tag 170 is disposed within the defined region 156 and is coupled to the back cover 114. Thus, the combination of the NFC antenna 151 and RFID tag 170 as positioned in FIG. 4 take up less space of the back cover 114 than the NFC antenna 150 and RFID tag 170 as positioned in FIG. 2 and is thinner in the direction perpendicular to the back cover as compared to the NFC antenna 150 and RFID tag 170 combination of FIG. 3.

A significant portion of the ferrite sheet 153 can be removed without negatively impacting the range of the NFC antenna 151. In one embodiment, for example, at least a portion of the interior boundary 154 is between 5 and 10 millimeters (mm) from the coil 158. However, it may be undesirable to remove more of the ferrite sheet 153 than is necessary to fit the RFID tag 170 within the region 156. Thus, in another embodiment, for example, the interior boundary 154 is no more than 2 mm from the RFID tag 170. In another embodiment, the interior boundary 154 is no more than 1 mm from the RFID tag 170. In one embodiment, for example, the RFID tag 170 may contact the interior boundary 154.

Although FIGS. 1-4 have been described with respect to embodiments in which a portion of an NFC antenna surrounds an RFID tag, it should be appreciated that the teachings herein, including but not limited to the teachings of space reduction, are equally applicable to other components of an electronic device. In one embodiment, for example, an electronic device includes a loop antenna surrounding an RFID tag. In another embodiment, for example, an electronic device includes an inductive charging loop surrounding an RFID tag. In another embodiment, an electronic device comprises a conductive coil surrounding a battery, a memory, or another component.

In one embodiment, the coil surrounds a self-contained component or system. For example, in one embodiment, the coil surrounds an RFID tag that is not coupled to any other component of the electronic device. In one embodiment, the coil surrounds only a portion of the ferrite sheet and other components that are isolated from all other components of the electronic device.

Figure 5:
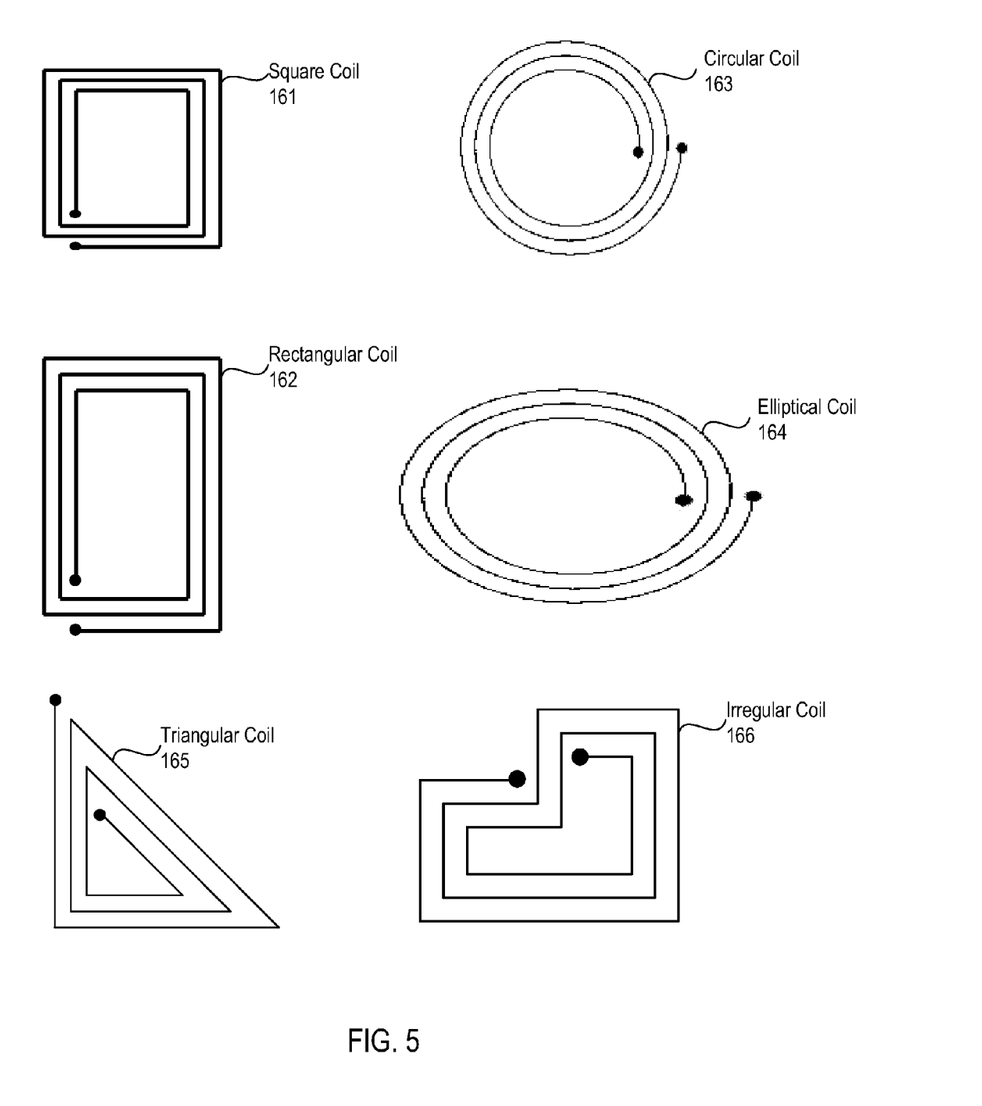
FIG. 5 illustrates different embodiments of the shape of the NFC antenna coil.

FIG. 5 illustrates different embodiments of the shape of the NFC antenna coil. Each of the coils 161-166 may be used as the coil of an NFC antenna, such as coil 158 of FIGS. 2-4. The square coil 161 includes a number of straight segments. In particular, the square coil 161 has a length in a first dimension that is approximately the same as a length in a second, perpendicular dimension. The rectangular coil 162 includes a number of straight segments. In particular, the rectangular coil 162 has a length in a first dimension that is different than a length in a second, perpendicular dimension. The circular coil 163 includes a number of curved segments. In particular, the circular coil 163 has a length in a first dimension that is approximately the same as a length in a second, perpendicular dimension. The elliptical coil 164 includes a number of curved segments. In particular, the elliptical coil 164 has a length in a first dimension that is different than a length in a second, perpendicular dimension. The triangular coil 165 includes a number of straight segments. The irregular coil 166 includes a number of straight segments, but can also include round segments, and may be formed in any shape. It should be note that each of the above noted shapes may be distorted somewhat from their namesakes and still be considered to have such a named shape. For example, the segments of the square shaped coil may be slightly curved as opposed to straight and the coil would still be considered to be squared shape. As another example, the segments of the square shaped coil may be connected by rounded corners and still be considered to be squared shape.

Although the coil shapes illustrated in FIG. 5 are constrained to a generally planar shape, it is to be appreciated that the coil may be formed in three dimension. In particular, the coil may include segments that extend in more than one plane such that the intersections of the segments are non-coplanar.

Figure 6:
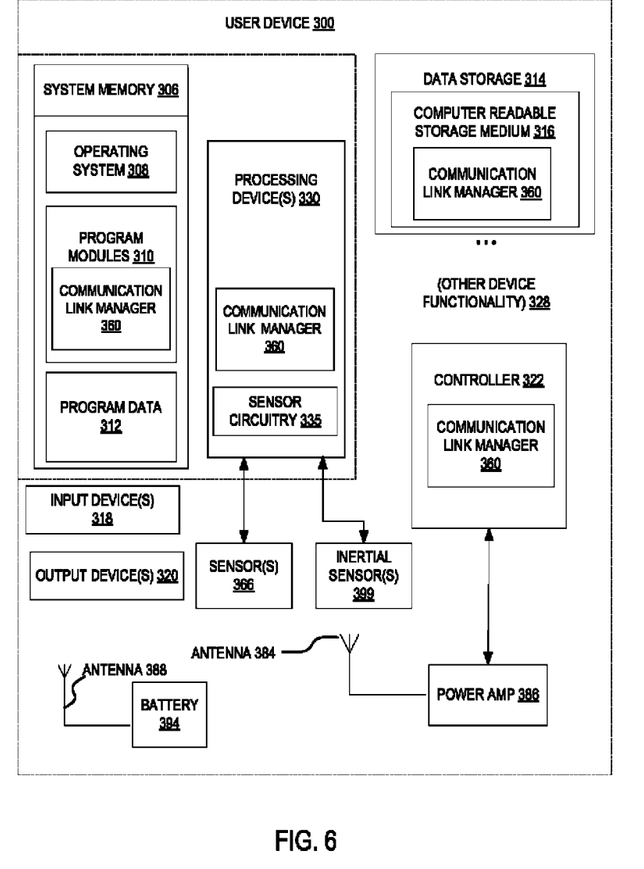
FIG. 6 illustrates an exemplary electronic device including the NFC antenna and RFID tag according to one embodiment.

FIG. 6 illustrates an exemplary electronic device 300 including the NFC antenna and RFID tag according to one embodiment. The electronic device 300 may correspond to the electronic device 100 of FIG. 1 and may be any type of computing device such as an electronic book reader, a PDA, a mobile phone, a laptop computer, a portable media player, a tablet computer, a smart phone, a camera, a video camera, a netbook, a desktop computer, a gaming console, a digital video disc (DVD) player, a computing pad, a media center, and the like.

The electronic device 300 includes one or more processing devices 330, such as one or more central processing units (CPUs), microcontrollers, field programmable gate arrays, or other types of processing devices. The electronic device 300 also includes system memory 306, which may correspond to any combination of volatile and/or non-volatile storage mechanisms. The system memory 306 may include one or more of read-only memory (ROM), flash memory, dynamic random access memory (DRAM) such as synchronous DRAM (SDRAM)), and static random access memory (SRAM)). The system memory 306 stores information which provides an operating system component 308, various program modules 310 such as communication link manager 360, program data 312, and/or other components. The electronic device 300 performs functions by using the processing device(s) 330 to execute instructions provided by the system memory 306.

The electronic device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the communication link manager 360 may reside, completely or at least partially, within the computer readable storage medium 316, system memory 306 and/or within the processing device(s) 330 during execution thereof by the electronic device 300, the system memory 306 and the processing device(s) 330 also constituting computer-readable media. The electronic device 300 may also include one or more input devices 318 (keyboard, mouse device, specialized selection keys, etc.) and one or more output devices 320 (displays, printers, audio output mechanisms, etc.). In one embodiment, the input devices 318 and the output devices 320 may be combined into a single device (e.g., a touch screen).

The electronic device 300 further includes a wireless controller 322 to allow the electronic device 300 to wirelessly communicate with other computing devices. The wireless controller 322 allows the electronic device 300 to handle both voice and non-voice communications (such as communications for text messages, multimedia messages, media downloads, web browsing, etc.). The wireless controller 322 may also allow the electronic device 300 to handle other signaling data to facilitate communication of the voice and non-voice data between the electronic device 300 and other devices. The wireless controller 322 may provide network connectivity using any type of mobile network technology including, for example, cellular digital packet data (CDPD), general packet radio service (GPRS), enhanced data rates for global evolution (EDGE), universal mobile telecommunications system (UMTS), 1 times radio transmission technology (1xRTT), evaluation data optimized (EVDO), high-speed down-link packet access (HSDPA), WiFi, HSPA+, WiMAX, Long Term Evolution (LTE) and LTE Advanced (sometimes generally referred to as 4G), etc. In one embodiment, the wireless modem includes the communication link manager 360 in addition to, or instead of, the communication link manager 360 being included in the computer readable storage medium 316, system memory 306 and/or processing device(s) 330. The communication link manager 360 may be implemented as hardware, firmware and/or software of the wireless controller 322. It should be noted that the controller 322 may include a processing component that performs various operations to handle both voice and non-voice communications. This processing component can execute the communication link manager 360. Alternatively, the communication link manager 360 can be executed by a processing component of the electronic device, such as the processing device 330.

The wireless controller 322 may generate signals and send these signals to power amplifier (amp) 380 for amplification, after which they are wirelessly transmitted via antenna 384. In one embodiment, the power amplifier 380 is part of the controller 322. In another embodiment, the controller 322 is directly coupled to the antenna 384. In one embodiment, the antenna may correspond to the NFC antenna 150 of FIGS. 2 and 3, the NFC antenna 151 of FIG. 4, or an antenna embedded in RFID tag 170 of FIGS. 2-4. The antenna 384 may be directional, omni-directional or non-directional antennas. In addition to sending data, the antenna 384 can be deployed to receive data, which is sent to wireless controller 322 and transferred to processing device(s) 330. In one embodiment, the antenna 384 may be used to form communication links between the electronic device 300 and a base station (e.g., a NodeB or a cell tower).

The processing device(s) 330 and the controller 322 may be a general-purpose processing devices such as a microprocessor, central processing unit, or the like. More particularly, the processing device(s) 330 and the controller 322 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device(s) 330 and the controller 322 may also be one or more special-purpose processing devices such as an application specific integrated circuit (ASIC), a field programmable gate array (FPGA), a digital signal processor (DSP), network processor, or the like.

In one embodiment, electronic device 300 includes one or more sensors 366 such as a physical contact sensor or close proximity sensors. The sensors 366 can detect the human body parts proximate to the electronic device, and convey information regarding the detection to processing device(s) 330. In one embodiment, the sensors 366 may be capacitive sensors that are configured to measure capacitance generated by the human body part proximate to the electronic device using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 366 may also be optical (e.g., infrared) sensors that use an emitter and receiver pair to detect the presence of opaque objects. Alternatively, the sensors 366 may be inductive sensors, which include an inductive loop. When the presence of a human body part (or metal object) is brought close to the inductive sensor, an induction of the inductive loop changes, causing the human body part to be detected. Alternatively, the sensors 366 may be ultrasonic sensors that emit an ultrasonic signal and measure a time duration between when a signal is transmitted and the reflection of that signal received (a.k.a., flight response). The sensors 366 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. It should also be noted that the sensors 366 may be used to determine a distance between one or more of the antennas and the detected human body part. Though the detected object is described herein as a human body part, other types of objects may also be detected depending on the sensing technologies used.

In one embodiment, electronic device 300 includes one or more inertial sensors 399. The inertial sensors 399 can be used to detect motion of the electronic device 300. In one embodiment, the inertial sensors 399 detect linear accelerations (translational movement) and angular accelerations (rotational movement). The inertial sensors 399 may include accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The inertial sensors 399 in one embodiment are micro-electromechanical systems (MEMS) sensors.

In one embodiment, the motion data from the one or more inertial sensors 399 may be used to determine an orientation of the electronic device 300 to determine if a communication link criterion is satisfied (e.g., whether the electronic device 300 is in proximity to a user's body). In another embodiment, the sensor data from the one or more sensors 366 may be used to determine an orientation of the electronic device 300 for to determine if a communication link criterion is satisfied. In a further embodiment, of the motion data and the sensor data may be used to determine whether a communication link criterion is satisfied.

The processing device(s) 330 may include sensor circuitry 335 (e.g., sensor device drivers) that enables the processing device(s) 330 to interpret signals received from the sensor(s) 366 and/or inertial sensors 399. In one embodiment, the sensors 366 and/or inertial sensors 399 output fully processed signals to the processing device(s) 330. For example, the sensors 366 may output a distance, a detected/not detected signal, etc. using a single line interface or a multi-line interface. Similarly, inertial sensors 399 may output an acceleration value (e.g., in Gs). In another embodiment, the sensors 366 output, for example, positional data and/or object presence data (e.g., of a human body part) to the processing devices) 330 without first processing the data. Similarly, inertial sensors 399 may output, for example, voltage values that can be interpreted as acceleration values. In either instance, the processing device(s) 330 may use the sensor circuitry 335 to process and/or interpret the received data. If data is received from multiple sensors 366 and/or inertial sensors 399, processing the data may include averaging the data, identifying a maximum from the data, or otherwise combining the data from the multiple sensors. In one embodiment, in which the sensors 366 include a sensor array, numerous sensors, or a touch panel, processing the data includes determining where on the electronic device the human body part is located from multiple sensor readings.

The electronic device 300 includes a battery 394 that can be used to store energy and provide power to the various components of the electronic device 300. The battery 394 is coupled to wireless charging antenna 388. The wireless charging antenna 388 may include an inductive coil. A current may be electromagnetically induced in the wireless charging antenna 388 by a charging station and the battery 394 is configured to charge from the current induced in the wireless charging antenna 388. In one embodiment, an RFID tag is surrounded by the wireless charging antenna 388. In particular, the RFID tag is surrounded by an inductive coil of the wireless charging antenna 388.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. An apparatus comprising:
 a near field communication (NFC) antenna comprising an electrically conductive coil disposed on a ferrite sheet, wherein the ferrite sheet has a hole through the sheet defining an interior boundary surrounding a region devoid of ferrite and the coil surrounds the region; and
 an ultra-high frequency (UHF) radio-frequency identification (RFID) tag disposed within the region.

2. The apparatus of claim 1, further comprising a cover, at least a portion of the cover being non-metallic, wherein the NFC antenna and the UHF RFID tag are coupled to the non-metallic portion of the cover.

3. The apparatus of claim 1, wherein the UHF RFID tag is configured to operate in a frequency range between 860 megahertz (MHz) to 960 MHz.

4. The apparatus of claim 1, wherein the NFC antenna is configured to operate at a frequency of about 13.56 MHz.

5. The apparatus of claim 1, wherein the coil comprises a rectangular coil, a square coil, a circular coil, or an elliptical coil.

6. The apparatus of claim 1, further comprising a controller coupled to the NFC antenna configured to transmit and receive data via the NFC antenna.

7. The apparatus of claim 1, wherein the UHF RFID tag comprises a passive UHF RFID tag.

8. The apparatus of claim 1, wherein at least a portion of the interior boundary is between 5 mm and 10 mm from the coil.

9. The apparatus of claim 1, wherein no portion of the interior boundary is more than 1 mm from the UHF RFID tag.

10. An apparatus comprising:
- a radio-frequency identification (RFID) tag comprising a first antenna; and
- a near-filed communication (NFC) device comprising a second antenna comprising an electrically conductive coil disposed on a non-conductive ferrite sheet having a hole through the ferrite sheet, wherein the RFID tag is disposed within the hole and the coil surrounds the hole.

11. The apparatus of claim 10, wherein the second antenna comprises a loop antenna.

12. The apparatus of claim 10, wherein the second antenna comprises a near field communication (NFC) antenna.

13. The apparatus of claim 10, further comprising a controller coupled to the second antenna configured to transmit and receive data via the second antenna.

14. The apparatus of claim 10, wherein the second antenna comprises an inductive charging antenna.

15. The apparatus of claim 10, further comprising a battery coupled to the second antenna configured to charge from a current induced in the second antenna.

16. The apparatus of claim 10, further comprising a cover, wherein the non-conductive ferrite sheet is coupled to the cover.

17. The apparatus of claim 16, wherein RFID tag is coupled to the non-conductive ferrite sheet.

18. The apparatus of claim 16, wherein the RFID tag is coupled to the cover.

19. The apparatus of claim 16, wherein the cover comprises a non-metallic portion and wherein the non-conductive ferrite sheet is coupled to the non-metallic portion.

20. The apparatus of claim 10, wherein the coil comprises a square coil, a rectangular coil, a circular coil, or an elliptical coil.

21. An apparatus comprising:
- a radio-frequency identification (RFID) tag configured to operate at a first frequency; and
- a near field communication (NFC) antenna configured to operate at a second frequency which is different from the first frequency, wherein the NFC antenna is disposed on a ferrite sheet with an interior portion of the ferrite sheet removed to define a region, wherein the RFID tag is disposed within the region.

22. The apparatus of claim 21, wherein the second frequency is at least an order of magnitude lower than the first frequency.

23. The apparatus of claim 21, wherein the NFC antenna comprises an electrically conductive coil disposed on the ferrite sheet.

24. The apparatus of claim 21, wherein the NFC antenna comprises a square coil, a rectangular coil, a circular coil, or an elliptical coil.

25. The apparatus of claim 21, wherein the RFID tag comprises a passive RFID tag.

* * * * *